INVENTORS.
Robert H. Smith
BY John J. Lenosky

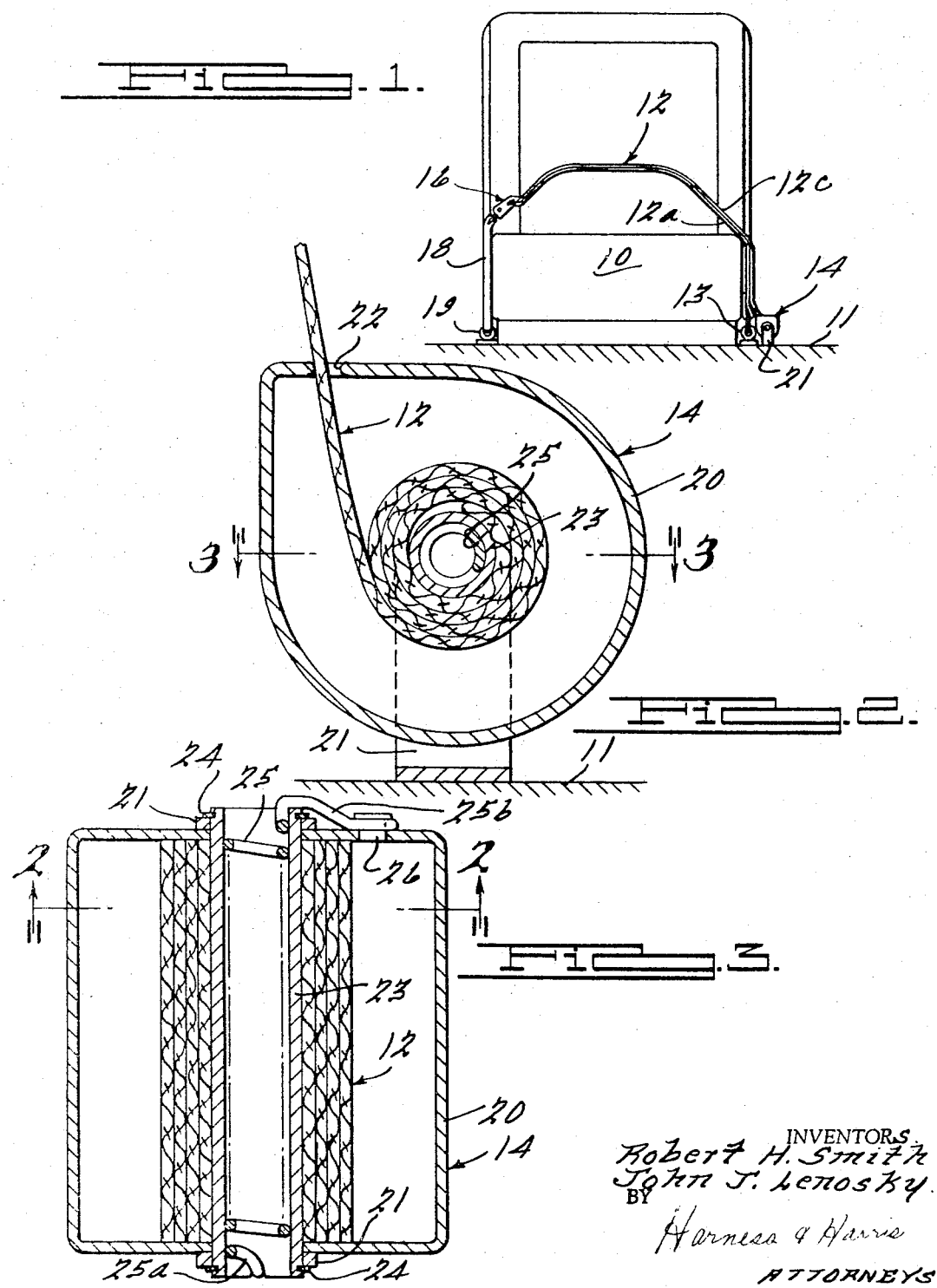

Harness & Harness
ATTORNEYS.

United States Patent Office 3,313,573
Patented Apr. 11, 1967

3,313,573
LOW FRICTION SEAT BELT RELEASE
Robert H. Smith, Southfield, and John J. Lenosky, Highland Park, Mich., assignors to Chrysler Corporation, Highland Park, Mich., a corporation of Delaware
Filed Mar. 25, 1965, Ser. No. 442,653
8 Claims. (Cl. 297—388)

This invention relates to safety belts and in particular to an automobile seat belt, although the invention can be readily used in other situations where a safety belt is desired.

A frequent objection to the use of automobile seat belts, particularly by the driver, is that the ends of the belt are not confined to a predetermined location when the belt is not in use and are accordingly not readily accessible. Often one or both of the belt ends are lost behind or at the sides of the seat, such that an individual in the automobile will ignore the seat belt rather than fish for it while the automobile is in motion. Even when the ends of the seat belt are accessible, the driver will frequently not use the belt if it will restrain his body movements during a maneuver from a parking space, for example. Thereafter while on the road, he finds it difficult to adjust and fasten the seat belt without taking his hands from the steering wheel and thus often fails to use the safety belt at all.

Important objects of the present invention are to provide an improved safety belt and arrangement in the fastening device therefor which avoid the above problems and assure that the ends of the belt when not in use are always in a predetermined location at the sides of the seat and available for use.

Another object is to provide such a seat belt which is self adjusting in length so as to fit any user without inconvenience, which can be readily employed and secured by the user with one hand, and which when secured will effect a predetermined safe and comfortable tension across the user's body.

Another and more specific object is to provide an arrangement in a seat belt type safety device comprising a belt secured at a fixed end adjacent one side of the seat occupied by the user and having a free end secured to a belt dispenser which is in turn secured to a fixed portion of the automobile adjacent said fixed end, thereby to provide a loop in the belt between the dispenser and fixed end. Belt locking means engaging the belt within said loop is adapted for movement relative to the belt in either direction therealong and to be shifted to a locking position with respect to the belt to interlock therewith against said relative movement in the direction from said fixed end toward said dispenser. The locking means is engaged within the belt loop so as to exert a pull thereon and on the two lengths of the belt extending from the loop to said dispenser and fixed end respectively when the locking means is pulled in a direction away from the fixed end and dispenser. The latter also carries a suitable length of the belt and yieldingly dispenses the same when the locking means is pulled across the body of the user in the direction from the fixed end, or retracts the belt and locking means toward the dispenser to a rest position when the locking means is released. The locking means is adapted to be readily gripped by one hand of the user and pulled across his body and is cooperable with the fixed retainer at the opposite side of the seat for automatically interlocking therewith when the locking means is shifted to its locking position with respect to the belt.

The belt is yieldingly dispensed against the tension of resilient means, which may be provided in a portion of the belt between the locking means and dispenser, as for example in a belt portion of laminated structure having a resilient layer under tension urging retraction of the belt and locking means toward the dispenser, or which may comprise other spring means effective to urge retraction of the belt to the dispenser and thus yieldingly urge the locking means in the direction toward the dispenser and fixed end of the belt. When the locking means is pulled manually across the body of the occupant of the seat and interlocked with the retainer as aforesaid, the belt will be maintained at a predetermined tension by the resilient means urging retracting of the belt. In consequence, the belt will be secured without slack and under predetermined tension around the occupant of the seat to assure optimum efficiency and safety in its restraining action.

Other objects of this invention will appear in the following description and appended claims, reference being had to the accompanying drawings forming a part of this specification wherein like reference characters designate corresponding parts in the several views.

FIGURE 1 is a fragmentary front elevational view of an automobile seat and safety belt embodying the present invention;

FIGURE 2 is a fragmentary enlarged sectional view through the belt dispensing mechanism of FIGURE 1, taken in the direction of the arrows substantially along the broken line 2—2 of FIGURE 3;

FIGURE 3 is a sectional view taken in the direction of the arrows substantially along the broken line 3—3 of FIGURE 2;

Figure 4:
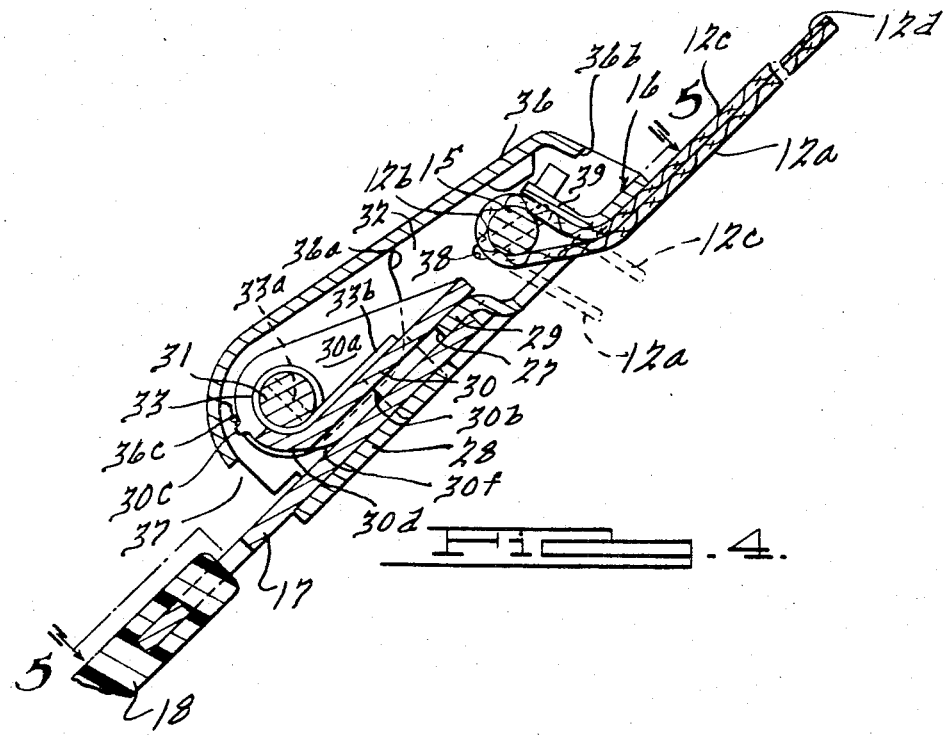
FIGURE 4 is a fragmentary enlarged sectional view taken longitudinally of the belt through the locking means and retainer of FIGURE 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a specific embodiment of the present invention is illustrated by way of example comprising an automobile seat 10, which may be either a front or rear seat, single or double, but in the present instance is the driver's bucket seat mounted on a fixed support 11 comprising the body floor or chassis. A flexible safety belt 12 having a fixed end 13 secured to the support 11 and a free end contained within a dispenser 14 is adapted to extend in doubled thickness snugly across the body of the occupant of the seat 10 and to serve as a restraint. A length 12a of the belt 12 extends from the fixed end 13 to a loop 12b where the belt 12 loops back on itself to provide a length 12c thereof extending from the loop 12b to the dispenser 14. The loop 12b extends around a knurled bar 15 comprising part of a one-way belt locking means indicated generally by the numeral 16. The latter is adapted to move freely relative to the belt in either direction therealong when the locking means 16 and belt 12 are arranged at a predetermined release angle with respect to each other, as indicated by the dotted position of the belt 12 in FIGURE 4, and to interlock with the belt 12 when arranged at a predetermined locking angle with respect to the belt 12, as indicated by the solid line position of the belt in FIGURE 4. Any convenient conventional one-way belt locking means can be employed, a specific device suitable for use herein being described below.

The locking means 16 is releasably secured to a steel blade 17 of a fixed retainer 18 which in turn is secured at its lower end 19 to the support 11. In the above regard, the fixed belt end 13, retainer end 19, and dispenser 14 may be secured to any suitable part of the automobile, as for example the frame of seat 10, the vehicle body understructure or side structure. Also, the concept of the safety assembly shown may be used in other personnel retention assemblies, as for example of the shoulder type harness.

The retainer 18 is preferably of rigid material adapted to remain in a fixed position with respect to the seat 10. Where desired, the retainer 18 may be pivotally secured at 19 to the support 11, in which case the pivotal connection 19 will be provided with sufficient friction to hold the retainer 18 in any position of angular adjustment while enabling the retainer 18 to be swung out of the way of a passenger moving into or out of the automobile.

The belt dispenser 14 comprises a plastic or sheet metal housing 20, means for selectively dispensing or retracting the belt 12, and also a bracket 21 secured to the support 11. The belt 12 extends upwardly from its fixed attachment 13 adjacent one side of the seat 10, thence around bar 15 and back on itself and through an opening 22 in the housing 20 to the hollow spool or reel 23 to which the other end of the belt 12 is secured and on which the belt 12 is spirally wound. The opposite ends of the spool 23 are journaled in spaced arms of the bracket 21 and are retained against displacement therefrom by C-shaped retainers 24 partially embedded in the outer circumference of the spool 23 adjacent and exteriorly of the housing 20. A coil winding spring 25 extends coaxially within the spool 23, one end 25a of the spring extending through and being secured within a slot in an end of the spool 23, the other end 25b extending endwise and radially of the spool 23 and being anchored by means of a stud 26 secured to the housing 20. The spring 25 is biased under tension tending to wind the spool 23 about its axis counterclockwise in FIGURE 2 so as to reel in or retract the belt 12 into the housing 20 and to pull the roller 15 engaged in loop 12b rightward in FIGURES 1 and 4 toward the fixed end 13 of the belt 12. Although a left handed belt dispensing assembly is shown, the attachments 13, 14 and 19 could be reversed so that the locking means 16 would travel from right to left across the occupant of the seat 10.

Figure 5:
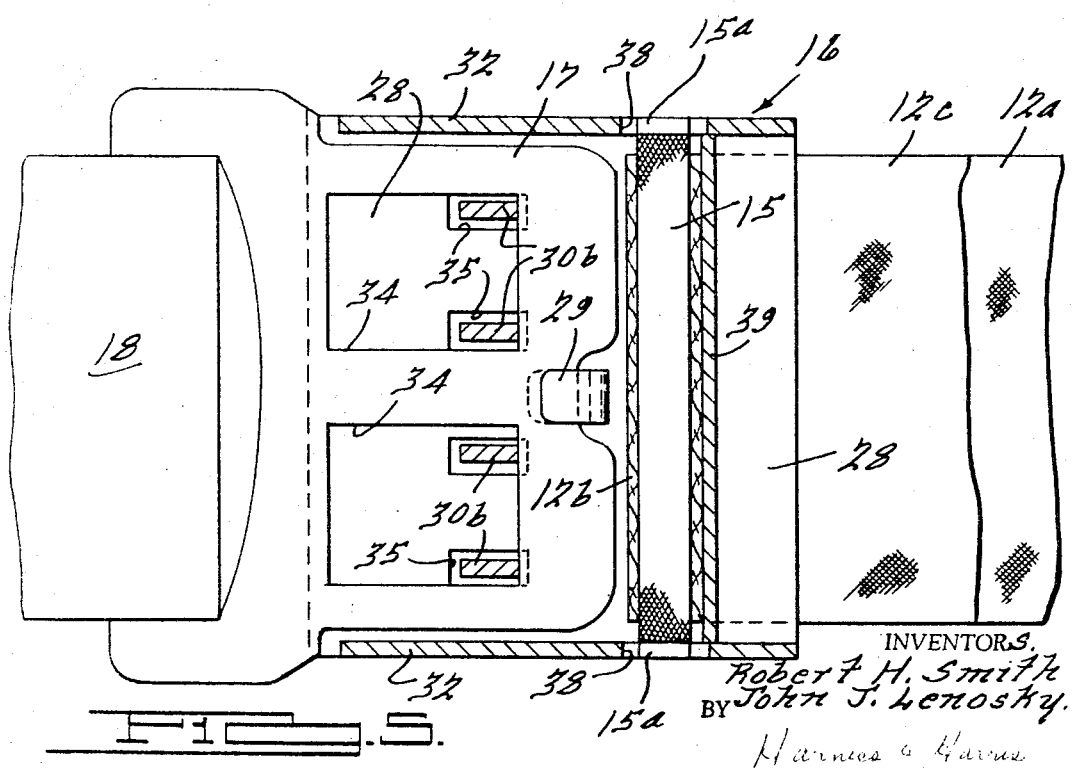
FIGURE 5 is a sectional view taken in the direction of the arrows substantially along the broken line 5—5 of FIGURE 4.

Referring to FIGURES 4 and 5, a portion 27 is lanced from a platform 28 of locking means 16 to provide a parallel and offset hook 29 overlying the upper end of blade 17 when the latter is engaged with the locking means 16. A pivotal latch 30 has lateral webs or sides 30a journaled on a shaft 31 secured at its opposite ends to opposite sides 32 of the locking means 16, which sides 32 are integral with platform 28. A spiral spring 33 extending coaxially around the shaft 31 has one end 33a extending diametrically through the shaft 31 and secured thereto. The opposite spring end 33b engages the latch 30 under resilient tension urging the latter clockwise in FIGURE 4 to a latching position. A plurality of dogs 30b integral with latch 30 extend through holes 34 in the blade 17 and holes 35 in the platform 28 when the locking means 16 and retainer 18 are interlocked as illustrated. As shown in FIGURE 5, the inner edges of the blade 17 defining the holes 34 engage the dogs 30b to prevent separation of the blade 17 from the locking means 16.

In order to release the blade 17 from the locking means 16, a pivotal release handle 36 is provided with side flanges 36a located between the sides 30a and sides 32 and pivotally mounted on the shaft 31. The handle 36 terminates in a finger engaging tip 36b spaced outwardly from the platform 28 and readily accessible to the occupant of the seat to be pivoted counterclockwise in FIGURE 4. A lug 36c of the handle's side flanges 36a engages a lug 30c of the locking member 30, so that upon counterclockwise pivoting of the handle 36, the latch 30 will also be swung counterclockwise to move the dogs 30b out of engagement with the blade 17 and enable separation of the latter from the locking means 16. If the locking means 16 is then allowed to move freely, the spring 25 will wind the belt onto the spool 23, thereby to pull the belt around the bar 15 and shorten both belt lengths 12c and 12a until the locking means 16 is pulled rightward in FIGURE 1 to the limit of possible movement near the left edge of the seat 10. Upon manual release of the handle 36, the spring 33 urging latch 30 clockwise in FIGURE 4, will cause lug 30 to engage lug 36c and swing handle 36 clockwise to the position shown.

By virtue of the construction described, when the safety belt is not in use, the locking means 16 will be yieldingly maintained in a predetermined position adjacent the left edge of the seat 10. When it is desired to apply the safety belt, the occupant of the seat 10 will take the locking means 16 in one hand, hold it at the release angle relative to the belt 12 approximately as shown by the dotted position of the belt in FIGURE 4, and pull the locking means across his body, causing the belt 12 to unreel against the tension of spring 25 and to slide around the bar 15 at the loop 12b in the direction from 12c toward 12a. The locking means 16 is then fitted by one hand over the upstanding end of the blade 17, which may be inclined from the vertical to facilitate the desired interconnection, such that the blade 17 enters the opening 37 at the leading portion of the locking means 16. In this regard, the leading edge of the pivotal latch 30 is curved at 30d generally coaxially around the shaft 31, so as to provide a cam surface directing the blade 17 toward the platform 28.

Embossed from the latch 30 are a pair of cam projections 30f which provide cam surfaces cooperable with the edge 30d to guide the upper edge of the blade 17 with respect to the platform 28. As the locking means 16 is forced downwardly against the upstanding blade 17, it will be automatically moved angularly to the locking angle with respect to the belt 12, solid lines, FIGURE 4. At this position, the belt lengths 12a and 12c will lie side by side approximately in parallelism with the platform 28, and the locking means 16 will be interlocked with the belt 12 against relative movement therealong in the direction away from the fixed end 13. However, the locking means 16 will still be free for retracting movement relative to the belt in the opposite direction, so that tension in the belt length 12c exerted by the winding spring 25 will draw the belt 12 around the roller 15 and maintain the belt length 12a taut across the body of the user with a predetermined force depending upon spring 25. Additional tightening of the belt length 12a can be effected if desired by pulling manually on the belt length 12c in the direction toward reel 14, whereupon reel spring 25 will take up the slack in the belt length 12c.

As illustrated in FIGURES 4 and 5, the knurled bar 15 is provided with diametrically extending flattened end portions 15a closely confined within and adapted to slide longitudinally of mating slots 38 in the opposite sides 32 of locking means 16. The slots 38 extend in parallelism with each other and at a slight angle to the platform 28 so as to incline toward the latter in the direction of extension of the belt lengths 12a and 12c. Spaced from the bar 15 by the belt 12 is a backing plate 39 lanced from the platform 28. The plate 39 extends across the width of the belt 12 so as to clamp the latter against the bar 15 in a wedge action when the bar 15 is urged rightward along the slots 38, as for example, when a predetermined tension is applied to the belt length 12a tending to effect relative movement of the locking means 16 along the belt 12 in the direction away from the fixed end 13. Thus when the locking means 16 is engaged with the blade 17 as illustrated in FIGURE 4, the greater the force applied by the body of the user against the belt length 12a, the greater will be the clamping action of the bar 15 and backing 39 against the belt 12. The backing 39 extends angularly from the platform 28 so as to direct the belt length 12c toward the bar 15 at the desired release angle. Thus even when the locking means is in the locking position of FIGURE 4, the belt 12 can be readily reeled onto the spool 23 under the tension of spring 25 without effecting the aforesaid clamping or interlocking engagement of the locking elements 15, 39 with the belt 12.

It is apparent that when the locking means 16 is engaged with the blade 17, FIGURE 4, the entire load of restraining the body of the user against forward movement from the seat 10 is sustained by the belt length 12a. The only tension on the belt length 12c is that applied by the spring 25. When the belt is unreeled to the maximum extent during normal operation to restrain an occupant within the seat 10, the major portion of the belt length 12c extending from the reel or spool 23 toward the locking means 16 may be of substantially reduced thickness as indicated at 12d, FIGURE 4. The diameter of the total windings of the belt 12 on the spool 25, when the belt is in the fully retracted position, can thus be substantially reduced and a comparatively small housing 20 can be employed.

We claim:

1. In a safety device, supporting means, a safety belt having a fixed end secured to said supporting means, dispensing means for carrying said belt and for dispensing the same in the direction from said dispensing means toward said fixed end, means for securing said dispensing means to said supporting means, means for subjecting said belt to tension to reduce slack in the portion thereof between said dispensing means and fixed end, including resilient means for yieldingly urging retraction of said belt in the direction toward said dispensing means, a retainer secured to said supporting means, one-way locking means movable with respect to said belt in either direction along said portion thereof and engageable in a locking condition with said belt portion for interlocking therewith against relative movement therealong in the direction from said fixed end toward said dispensing means, buckle means on said retainer and locking means for interlocking upon movement of said locking means in said locking condition into predetermined engagement with said retainer.

2. In the combination according to claim 1, the major portion of said belt extending from said dispensing means to adjacent said locking means having an appreciably smaller cross section than the remainder of said belt when said dispensing means has dispensed the maximum length of said belt to be dispensed during normal operation.

3. In a safety device, supporting means, a safety belt having a fixed end secured to said supporting means, dispensing means for carrying said belt and for dispensing the same in the direction from said dispensing means toward said fixed end, means for securing said dispensing means to said supporting means, means for subjecting said belt to tension to reduce slack in the portion thereof between said dispensing means and fixed end, including resilient means for yieldingly urging retraction of said belt in the direction toward said dispensing means, a retainer secured to said supporting means, one-way locking means engaging said belt portion and movable with respect thereto in either direction therealong, said locking means having portions shiftable to a locking position with respect to said belt portion for interlocking therewith against relative movement therealong in the direction from said fixed end toward said dispensing means, buckle means on said retainer and locking means for interlocking upon movement of said locking means in said locking position into predetermined engagement with said retainer.

4. In a safety device, supporting means, a safety belt having a fixed end secured to said supporting means, dispensing means for carrying said belt and for dispensing the same in the direction from said dispensing means toward said fixed end, means for securing said dispensing means to said supporting means at a location adjacent said fixed end to effect a loop in the portion of said belt between said dispensing means and fixed end, means for subjecting said belt to tension to reduce slack in the loop portion thereof, including resilient means for yieldingly urging retraction of said belt in the direction to said dispensing means, a retainer secured toward said supporting means, one-way locking means engaging said loop portion and movable with respect to said belt in either direction therealong, said locking means having portions shiftable to a locking position with respect to said belt for interlocking therewith against relative movement therealong in the direction from said fixed end toward said dispensing means, buckle means on said retainer and locking means for interlocking upon movement of said locking means in said locking position into predetermined engagement with said retainer.

5. In a safety device, supporting means, a safety belt having a fixed end secured to said supporting means, dispensing means for carrying said belt and for dispensing the same in the direction from said dispensing means toward said fixed end, means for securing said dispensing means to said supporting means adjacent said fixed end to effect a loop in the portion of said belt between said dispensing means and fixed end, said belt having two portions extending from said loop toward said dispensing means and fixed end respectively in side-by-side relationship throughout the major extent of their lengths, means for subjecting said belt to tension to reduce slack in said portions including resilient means for yieldingly urging retraction of said belt in the direction toward said dispensing means, a retainer secured to said supporting means manually engageable means for lengthening said belt portions and for pulling said loop across the body of a user of said device in a belt dispensing action upon movement of said manually engageable means across said body including, one-way locking means having an element engaging said belt within said loop and movable with respect to said belt in either direction therealong, said locking means being shiftable to a predetermined angular locking position with respect to said portions of said belt adjacent thereto for interlocking said element with said belt against relative movement therealong in the direction from said fixed end toward said dispensing means, and buckle means on said retainer and locking means for interlocking upon movement of said locking means in said locking position into predetermined engagement with said retainer.

6. In a safety device, supporting means, a safety belt having a fixed end secured to said supporting means, dispensing means for carrying said belt and for dispensing the same in the direction from said dispensing means toward said fixed end, means for securing said dispensing means to said supporting means adjacent said fixed end to effect a loop in the portion of said belt between said dispensing means and fixed end, said belt having two portions extending from said loop toward said dispensing means and fixed end respectively in side-by-side relationship throughout the major extent of their lengths, means for subjecting said belt to tension to reduce slack in said portions including resilient means for yieldingly urging retraction of said belt in the direction toward said dispensing means, a retainer secured to said supporting means, manually engageable means for lengthening said belt portions and for pulling said loop across the body of a user of said device in a belt dispensing action upon movement of said manually engageable means across said body including one-way locking means movable with respect to said belt in either direction therealong, said locking means being shiftable to a predetermined angular locking position with respect to said portions of said belt adjacent thereto and having relatively shiftable elements engaging opposite sides of said belt at said loop for clamping said belt against relative movement with respect to said locking means in the direction along said belt from said fixed end when said locking means is shifted to said locking position, and buckle means on said retainer and locking means for interlocking upon movement of said locking means in said locking position into predetermined engagement with said retainer.

7. In a safety device, supporting means, a safety belt having a fixed end secured to said supporting means, a belt dispensing reel for carrying said belt and for dispensing the same in the direction from said reel toward said fixed end, means for securing said reel to said supporting means adjacent said fixed end to effect a loop in the portion of said belt between said reel and fixed end, said belt having two portions extending from said loop toward said reel and fixed end respectively in side-by-side relationship throughout the major extent of their lengths, means for subjecting said belt to tension to reduce slack in said portions including resilient means for yieldingly urging winding of said belt on said reel, a retainer secured to said supporting means, manually engageable means for lengthening said belt portions and for pulling said loop across the body of a user of said device in a belt dispensing action upon movement of said manually engageable means across said body including one-way locking means movable with respect to said belt in either direction therealong, said locking means being shiftable to a predetermined angular locking position with respect to said portions of said belt adjacent thereto and having relatively shiftable elements engaging opposite sides of said belt at said loop for clamping said belt against relative movement with respect to said locking means in the direction along said belt from said fixed end when said locking means is shifted to said locking position, and buckle means on said retainer and locking means for interlocking upon movement of said locking means in said locking position into predetermined engagement with said retainer.

8. In the combination according to claim 7, the major portion of said belt extending from said reel to adjacent said locking means having an appreciably smaller cross sectional area than the remainder of said belt when the maximum length of said belt is dispensed during operation.

References Cited by the Examiner

UNITED STATES PATENTS

| | | | |
|---|---|---|---|
| 2,846,745 | 8/1958 | Lathrop | 24—179 |
| 2,855,028 | 10/1958 | Matthews | 297—388 |
| 2,861,627 | 11/1958 | Smith | 297—388 |
| 2,971,730 | 2/1961 | Martin | 297—388 X |
| 3,227,489 | 1/1966 | Stubblefield | 297—388 |
| 3,246,377 | 4/1966 | Brown | 24—230 |
| 3,248,148 | 4/1966 | Board et al. | 297—388 |
| 3,249,386 | 5/1966 | Board et al. | 297—388 |

FRANK B. SHERRY, *Primary Examiner.*

CASMIR A. NUNBERG, *Examiner.*